United States Patent Office 3,500,636
Patented Mar. 17, 1970

3,500,636
GAS TURBINE PLANTS
Hugh Robert Morton Craig, Sale, England, assignor to Associated Electrical Industries Limited, London, England, a British company
Filed Feb. 14, 1967, Ser. No. 615,943
Claims priority, application Great Britain, Feb. 18, 1966, 7,349/66, 7,350/66; Oct. 17, 1966, 46,238/66
Int. Cl. F02c 9/14, 3/06, 7/02
U.S. Cl. 60—39.03      11 Claims

ABSTRACT OF THE DISCLOSURE

Gas turbine shaft-power plant including a high pressure compressor set positively driven by a gas turbine set and delivering working air to the turbine set through air heating means. The high pressure compressor set is supplied with air from a low pressure compressor and provision is made for selectively controlling the pressure ratio of the low pressure compressor either by driving it through a controllable variable speed transmission means from the gas turbine set, or by controllably driving it by a separate engine energised by exhaust heat from the gas turbine, or by providing it with controllable variable-stagger blading.

BACKGROUND OF THE INVENTION

Field of the invention

This invention relates to gas turbine plants as used, for instance, for ship propulsion or electricity generation.

The present invention relates to gas turbine plant for delivering shaft power (i.e. mechanical power), of the general kind in which a turbine set is supplied with compressed and heated air from a high-pressure (H.P.) compressor set delivering through air-heating means (usually a combustion chamber), the H.P. compressor set being driven positively by the gas turbine set (or part thereof) and the H.P. compressor set being itself supplied by air which has passed through a low pressure (L.P.) compressor which is arranged in series with the H.P. set. Such arrangement does not exclude a plant which in some operational conditions operates as above, but in which in another condition, the air is admitted directly to the H.P. compressor set. The H.P. compressor set may in practice comprise one or more compressors operating as a set in series.

The invention is applicable where the requirement is for a variable load at constant speed such as in an electric generator plant. For other forms of load, such for instance as the propeller law load met with in ship propulsion, a gas turbine of the kind having one rotor driving the main compressor, and another (power or free turbine) driving the load would be selected. The invention can equally be applied to compound cycles as to simple cycles, and the cycle can further include various measures for further enhancing performance in known manner. For instance the heat of the exhaust turbine gas can be used to generate, or to assist in generating, steam which can be utilized in the ways mentioned hereinafter. Alternatively or additionally an evaporator may be included in the exhaust system for producing auxiliary distillate supplies or make-up water for a steam generator. Intercooling may be provided in the compression system and reheat may be introduced between successive expansion stages in the gas turbine set, and so on.

Description of the prior art

In the usual gas turbine cycle, the gas turbine plant takes in air, compresses it, heats it, expands it to produce useful work in driving a load via an output shaft, and discharges hot gas to the atmosphere. Greater overall efficiency has been proposed to be obtained by abstracting and utilising heat from the exhaust gas in some way, for instance in a steam generator, the steam from which drives a steam turbine itself driving a separate load, for example an auxiliary electrical generator in the case of a ship propulsion plant. Alternatively steam could be injected upstream of the gas turbine to increase the mass flow without corresponding increase of compressor work.

In a simple gas turbine cycle the expansion of the hot compressed gas is performed in a single gas turbine and the compression is performed in a single compressor driven by this gas turbline additionally to the main load. In a compound cycle the compression is performed through at least two compressors in series driven by respective gas turbines one of which, or an additional gas turbine often called a power turbine or a free turbine, drives the load. In most cases where the power output is not required at constant speed, for instance in the case of the non-linear propeller law applicable to ship propulsion, a gas turbine driving both the load and a compressor may itself be split into two gas turbine sections driving that compressor and the load separately. The term "compressor set" will be used as connoting both the single compressor of a simple cycle and the two compressors of a compound cycle, and such will be referred to as a "high pressure compressor" whether there be one or more compressors. The term "gas turbine set" will likewise be used to connote both the simple cycle gas turbine and compound cycle gas turbines, in each case with or without splitting of the power turbine. The recognised abbreviations "L.P." and "H.P." will also be used when unmistakable in the context.

The invention, though described as applying to an open-cycle plant (i.e. one which induces from and exhausts to the atmosphere) could be applied to a closed cycle plant and in such case the working gas might not be air and combustion products, but some selected gas which is continuously recycled. Subject to this being understood, for brevity and simplicity we shall refer hereinafter to air as the induced working gas (implying that the exhaust gas is a mixture of air and combustion products); this is not to be taken to exclude a different working gas in a closed-cycle application.

The invention also lends itself conveniently to a plant which is required to be started by steam from any suitable source (such as other machinery in the same vicinity). In so far as a steam turbine is integrated in the plant according to the invention, as is intended in some forms, such may be energised by exhaust heat of the gas turbine, this being one of the potential contributory factors of the economy offered by the invention: waste-heat steam generation to operate a steam turbine adding to the total power output is a well known proposal.

SUMMARY OF THE INVENTION

The present invention has for its primary aim, a provision which will enable a gas turbine plant to deliver power at part-load with an efficiency of the same order as that which will apply to full load. Whether or not this aim is fully achieved will depend on the extent to which the invention is applied, but it may be said that a plant can be provided in which at (say) 55% of maximum power the efficiency is of the same order as the 100% power condition. Further, for a plant of given size, the invention may enable a very great increase of power output to be attained. It also affords the designer—in achieving high efficiencies and maximised power output—considerable flexibility in his choice of materials. For example, there being inherent to the invention a first or lower pressure (L.P.) compressor, it may be thermo-dynamically convenient to design this for a relatively low temperature range, in which case its blading, and other parts of its structure if advantageous, may be made of synthetic resinous basic material or other comparatively light and easily formable (though low-temperature) material.

According to the invention, there is provided gas turbine shaft-power plant of the kind including a high-pressure compressor set positively driven by a turbine set and delivering the working air to the turbine set through air-heating means, there being a low-pressure compressor of which the air output supplies the said high-pressure compressor set, in which there is provision for varying the mass flow of the working air for steady operating conditions (i.e. steady load) whilst maintaining $T_{max}$ at or substantially at a chosen value, such provision including means for selective control of the pressure ratio of the said low-pressure compressor.

Within the foregoing, the invention includes the provision of a low-pressure compressor, preferably of the multistage axial flow type, of which the pressure ratio is selectively controllable by varying the stagger of blading therein; and this feature is applied to several consecutive stages in the compressor. As a practical matter it is preferable to provide that the stagger of all stator stages except the last or perhaps the last and next to last, is variable, the extent of variation diminishing from the first stage.

For those familiar with the art it is unnecessary to describe in detail any particular construction or way of controlling variable-stagger blading in a multi-stage axial flow compressor. There are numerous examples of such blading, for example that of the first six or so consecutive stator rows of the well known J79 ("General Electric") gas turbine engine, and also various industrial gas turbines especially some of those designed for blast-furnace use. For the purposes of the present invention the construction and the way of operation are quite immaterial.

An advantage available by adoption of the invention relates to the maximum gas turbine operating temperature. At any given load other than extreme full load, the load can be achieved at a variety of operating conditions. Thus, the maximum temperature of operation may be chosen at any given load instead of being inherent in the machine for given ambient conditions. Because of this it can be chosen to operate over a wide range of part load at a maximum cycle temperature similar to that at full load. This is one of the basic reasons why such good part-load performance can be obtained. Known gas turbine cycles with high maximum temperatures at part load usually suffer from a serious disadvantage, namely that their full load output for any given maximum cycle temperature is very heavily dependent upon ambient temperature; the invention may overcome this disadvantage wholly or partly.

The invention in another aspect also includes provision whereby the low-pressure compressor is driven by a steam turbine which is supplied by an exhaust-heat boiler. This can be done in a variety of ways; for example the steam turbine may be used to contribute shaft power to that of the gas turbine set or it may be connected only to the low-pressure compressor; and such steam turbine, driving the low-pressure compressor independently, may be used to start and run up the plant.

It arises within the invention, therefore, that the mass flow in the plant for any given steady operating condition, and whilst the $T_{max}$ is maintained substantially at a chosen value (maybe to be exceeded for overload periods) is governed by the pressure ratio of the low-pressure compressor. Thus if any condition arises which tends to vary $T_{max}$, the mass flow is caused to vary so as to set off such condition. An increase of $T_{max}$ is corrected by an increase of mass flow and a decrease vice versa.

The usual convention is adopted that $T_{max}$ means the temperature of the working air at inlet to the gas turbine set.

It is intended according to the invention to provide for variation of the pressure ratio of the low-pressure turbine between its maximum design value, which may for example be somewhat above 2:1 and a minimum which may be unity or slightly greater than unit, or if the L.P. compressor be of suitable blade-design; its pressure ratio may even become "negative" (that is to say, less than unit) in which case the low-pressure compressor will act in some conditions as a turbine, and mechanical power generated by it may contribute to the power output of the plant, in such a case the pressure-drop through the L.P. compressor will of course be caused by the intake pressure of the H.P. compressor set being subatmospheric.

In some applications of the invention the L.P. compressor, being driven separately from the gas turbine set (for example being driven by a steam turbine) is used for starting purposes. It has previously been proposed to start gas turbine plant by supplying air to it under pressure, for example, fan pressure in an engine-room, but as far as we are aware it is novel to use an L.P. compressor supplying a compressor set in gas turbine plant, as distinct from a starting fan operating at a very low pressure ratio, for this purpose.

As will become clearer later, there may be provided shaft power plant comprising a gas turbine set mechanically driving at a constant speed ratio, and supplied with air by, a high-pressure compressor, and a low-pressure compressor arranged to deliver such air in series to the H.P. compressor, the L.P. compressor being energised directly or indirectly by the heat energy of the same air as that which has energised the said gas turbine set, whether by direct mechanical drive from the gas turbine set, or by a separate engine energised by exhaust-heat from said gas turbine and having either (a) controllably variable-stagger blading such that the pressure ratio of said first compressor at a given speed thereof is variable, or (b) provision such that the speed of the first compressor is variable relatively to that of the second compressor, or both. Thus in some applications the L.P. compressor is driven by transmission means which provide for its control of its own individual speed, and in some other applications the L.P. compressor is driven at its own individual speed by a steam turbine which, by the medium of a steam generator, is energised by the exhaust from the gas turbine set, with or without supplementary heat. When there is such a steam turbine it may contribute mechanical power directly in contribution to that of the gas turbine set. Likewise it may be arranged that the L.P. compressor is driven in part by the gas turbine set and in part by a steam turbine; and this condition is most likely to be beneficial at or near full load.

There may, also within the invention, be the case in which the L.P. compressor is disengaged so as not to run at all, when it is not required to contribute to air pressure; and in such case it may be bypassed by appropriate valve provision, so that the H.P. compressor set air intake is direct from atmosphere.

The control of the pressure ratio of the L.P. compressor, affected by any of the means above mentioned, may be responsive to any, or any combination, of the factors which are interdependent with $T_{max}$ (identified herein as "interdependent factors"), and these include: shaft power (measured by any of the many known means); an H.P. pressure ratio; the actual pressure measured at a selected point in the system; the rate of fuel supply; temperature at a selected point in the system; the mass flow of air; and additionally such control may be sensitive to ambient conditions such as atmospheric temperature and barometric pressure.

Examples of the invention will now be described with the aid of the accompanying diagrammatic drawings, in which the components are shown in the manner which is now conventional. In these examples and drawings.

Figure 1:
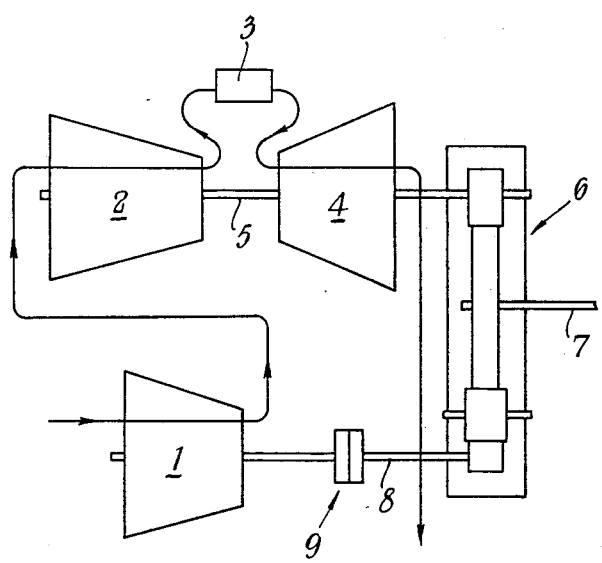
FIGURE 1 illustrates the case of L.P. compressor driven mechanically by the gas turbine set.

Referring to FIGURE 1, the plant comprises an L.P. compressor 1 of which the air output flows in series through the H.P. compressor 2, thence through the combustion chamber 3 where it is heated (and, of course, the products of combustion mix with diluent air) and so to the gas turbine 4. The H.P. compressor and the turbine are on an output shaft 5 which, through a reduction gearbox generally indicated at 6, delivers the required mechanical power output in a final drive shaft 7. Permanently engaged in the gearbox 6 is a further L.P. shaft 8, which drives the L.P. compressor 1.

Figure 1A:
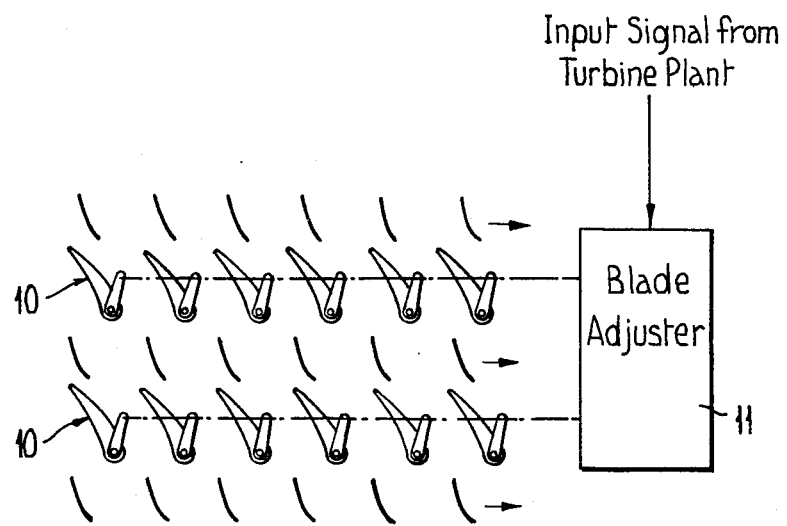
FIGURE 1a is an exemplary illustration of variable stator blading, including a blade adjuster which responds to an input signal from the turbine plant.

In one application of the invention the L.P. compressor 1 is a multi-stage axial compressor of the kind in which the stator blading is adjustable in stagger. Several examples of such compressor exist and are known to those engaged in the art, especially in relation to blast-furnace gas turbine plant, and is shown diagrammatically in FIGURE 1a. The pressure ratio of the L.P. compressor 1 is controllable by adjusting such blading 10 by any suitable known means 11 responsive to operating conditions of the plant. Though not illustrated it will no doubt occur to the skilled designer to provide an intercooler between compressors 1 and 2, in some circumstances.

In a variant of this simple example, and maybe instead of having the blading of the compressor 1 variable, a transmission unit 9 in shaft 8, is of change-speed type. Thus the speed of the L.P. compressor 1 can be controlled, and such control may be in substitution for the variable blade stagger or in addition to it. FIGURE 1, is therefore, an example of the plant in which the L.P. compressor is driven mechanically and directly by the gas turbine. As will become clearer from later description, the gas turbine set 4 may be as indicated conventionally, of single-rotor type (i.e. one turbine acting both as compressor-turbine and power-turbine); in a variant it may have two rotors in series or in parallel, one being a power turbine and the other a compressor turbine.

Figure 2:
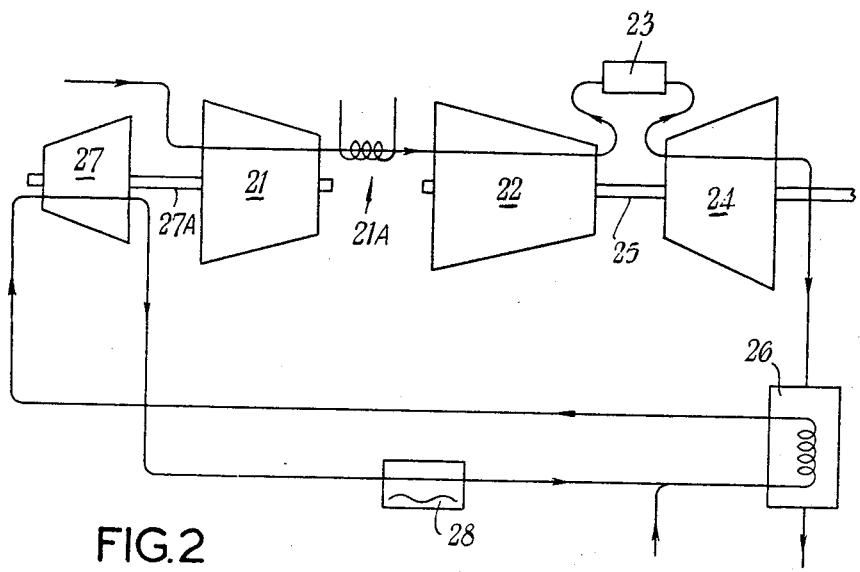
FIGURE 2 illustrates an example in which the L.P. compressor is independently driven by a steam turbine.

FIGURE 2 illustrates a less simple example of the invention. In this case the L.P. compressor 21 supplies air through one side of an intercooler heat-exchanger 21A to the H.P. compressor 22 and thence after heating in the combustion chamber 23 to the turbine 24 on shaft 25. The shaft 25 drives the H.P. compressor 22, and is also the output shaft for the mechanical output of turbine 24. The exhaust from the turbine 24 passes through a waste-heat boiler 26 which generates steam to drive a steam turbine 27 which drives the L.P. compressor 21 by shaft 27A. The steam turbine 27 exhausts by a condenser 28, the condensate returning to the boiler 26. Boiler feed water may be preheated in the intercooler 21A. The speed of the L.P. compressor 21 and therefore its pressure ratio, is controlled by controlling the speed of the steam turbine 27.

Figure 3:
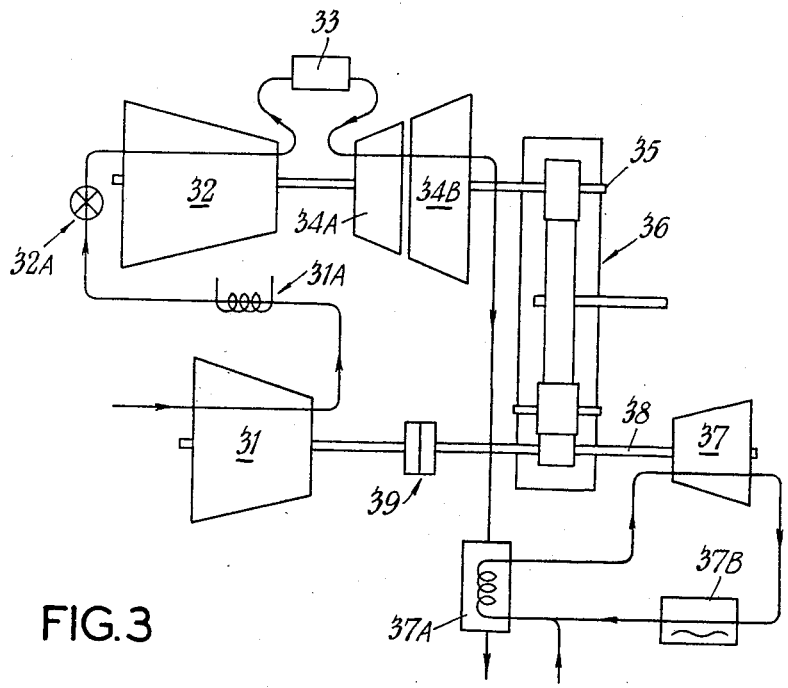
FIGURE 3 illustrates a modified form of the FIGURE 2 example, in which the steam turbine contributes to the plant power output.

FIGURE 3 illustrates a further example, which involves the schemes of FIGURES 1 and 2, together with further features. In this, the L.P. compressor 31 supplies air through intercooler 31A to the H.P. compressor 32, thence through combustion chamber 33 to the H.P. rotor 34A of a turbine set of which 34B refers to the power turbine, driving the shaft 35 and thence the gearbox 36 which is equivalent to gearbox 6 of FIGURE 1. A steam turbine 37 is energised by steam from waste-heat boiler 37A, and there is a condenser 37B, and again the intercooler 31A may preheat the feed-water. The steam turbine shaft 38 is positively entrained in the gearbox 36, and drives the L.P. compressor 31, through a change-speed unit 39. The L.P. compressor 31 may have variable-stagger blading. Thus, this example illustrates the invention with a variety of control possibilities; the speed of the L.P. compressor may be controlled by the unit 39 or its blade stagger may be controlled. The power from the steam turbine may contribute to the total shaft-power output of the whole plant or if the steam power be insufficient to meet the demand of the L.P. compressor, then the latter is driven in part by the steam turbine and in part by the gas turbine 34B. The unit 39 may be or may include a disengageable clutch, which if disengaged, enables the whole of the steam power to be added to that of the turbine 34B, the L.P. compressor then being cut out and left idle, by the opening to atmosphere of a valve the location of which is indicated at 32A which admits atmospheric air directly to the H.P. compressor.

Figure 4:
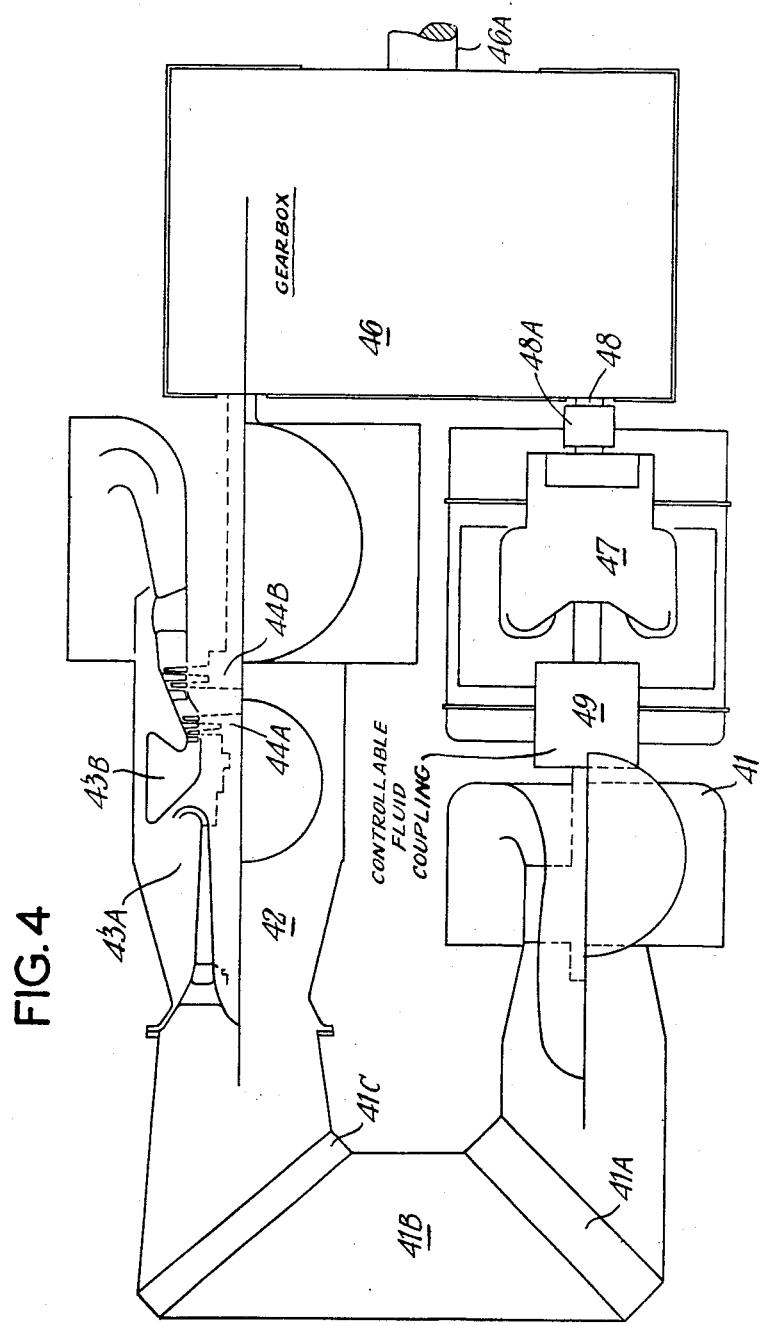
FIGURE 4 illustrates in plan a practical layout, corresponding to FIGURE 3, of a marine plant designed for use with a reversible variable-pitch propeller.

A marine plant, disposed somewhat on the lines of the FIGURE 3 example, is outlined in FIGURE 4. It is informative to give by way of example, some of the main design data in this case. The plant is conceived for naval or other marine use, with implications of requirements for quick starting, high efficiency at part load, compact layout, and favourable power/weight ratio. It is intended to operate with a reversible variable-pitch propeller. It can also supply steam for use other than within itself, such as non-propulsive purposes. The particular plant of FIGURE 4 was designed to deliver a maximum shaft power output of 20,000 H.P. at about 40% overall efficiency, and with part-load efficiency remaining substantially constant at that value down to about 35% of maximum power. This is due to the main feature of the invention which enables $T_{max}$ to be maintained over the range of powers between the minimum normal part-load and maximum load, the mass flow being controlledly varied. Using distillate fuel, it is estimated that the reduction in both space and weight of this plant (excluding any waste heat boiler) as compared with low speed mercantile diesel plant of the same maximum power, will be in the order of 80% (that is, a reduction of 80%).

In FIGURE 4, the L.P. compressor 41 is a four or five stage axial-flow machine with controllably variable stator blading as to all except the last stator stage. It operates at a maximum speed of 6,000 r.p.m. Its air output with a maximum pressure ratio of about 2.5:1, passes through an intercooler at 41A, which may be so formed aerodynamically as also to constitute a cascade to reduce aerodynamic losses in a bend in the L.P. air ducting 41B. At 41C, not detailed, there may be provided a large-area air admission valve, such as to admit the whole required mass flow of air directly to the H.P. compressor 42. The H.P. compressor is a 13-stage axial flow compressor of pressure ratio in the order 6:1, with maximum speed of 8,400 r.p.m. The outlet of the H.P. compressor is to a combustion chamber which leads from a casing 43A, through combustion space, to a turbine inlet at 43B. A H.P. compressor-driving turbine 44A is on the shaft of the H.P. compressor 42, and an L.P. power turbine 44B, with maximum speed of 6,000 r.p.m., drives directly into reduction and coupling gearbox 46 from which the propeller shaft 46A extends. Permanently positively entrained in the gearbox 46 is a steam-turbine shaft 48 of steam-turbine 47. The other end of the shaft 48 goes to a controllable fluid-coupling 49 by which the L.P. compressor 41 is driven. The coupling at 49 permits complete disengagement if the valve at 41C is opened to atmosphere; in this condition the compressor 41 is stopped.

A coupling, indicated at 48A, may take the form of a disengageable clutch. Then, if there be a suitable independent steam supply, the steam turbine 47 may be disengaged from the gearbox 46 and independently engaged with the L.P. compressor. The latter being now wholly steam driven can be used to start the gas turbine, since the L.P. air output is sufficient to rotate and speed up the compressor-turbine 44A and compressor 42.

In order that the invention be more exactly understood, it is instructive to compare various applications of it with prior art suggestions which have some degree of equivalency. This is demonstrated by reference to FIGURE 5, in which, reading down the left-hand column, are seen some representative cycles known in the art. These are individually indicated by letters A to G. In the right-hand column, there are indicated corresponding cycles according to the invention, correspondence being shown by the same letters further identified by asterisk, thus A* etc. In each case the compressor or compressors and gas turbine or gas turbines are indicated conventionally; a steam turbine is represented by a blocked-in rectangle, a controllable-speed coupling is represented by parallel vertical lines, and a compressor of which the stagger of blading may be controlled is so indicated by having a diagonal arrow across it.

A shows a simple open-cycle gas turbine, assisted by a waste-heat steam turbine on the same shaft, driving a mechanical load.

B shows a compound 2-shaft plant, in which the L.P. compressor is driven by L.P. turbine which also drives the load, H.P. compressor by H.P. turbine, and a waste heat steam turbine assists the L.P. turbine: supposedly a variable-speed plant.

C shows a constant-speed (alternator) plant having L.P. and H.P. compressors driven, at different but constantly related speeds, positively by a gas turbine assisted by a waste-heat steam turbine.

D is the well-known variant of A for variable speeds, in which a simple-cycle gas turbine is followed by a separate power-turbine assisted by a waste-heat steam turbine.

E shows a marine-type plant, in which the two shafts of a two-shaft-compound gas turbine are separate; the first compressor is driven by an L.P. turbine which is driven in series downstream from the H.P. turbine, the H.P. second compressor is driven by the H.P. turbine. The exhaust downstream from the H.P. turbine is divided, the other branch supplying the working turbine on the shaft of which is a waste-heat steam turbine.

F shows the cycle of A plus reduction gear.

G shows the cycle of B plus reduction gear.

Referring now to the right-hand column:

A* is similar to A, but in this case an L.P. compressor is driven by the steam turbine and is thereby made easily variable as to the work it does, by controlling the steam turbine.

B* shows the same change applied to the compound case of B.

C* functionally resembles C in that the L.P. compressor is positively driven at a speed determined by the gas turbine speed, and the steam turbine being in the L.P. shaft: the L.P. compressor has variable blade stagger.

D* is the same as C* except that, as in D, there is a separate power turbine as is more suitable for variable-speed drive (e.g. marine).

D** resembles D*, but a variable-speed transmission 50 is interposed between the steam turbine and the L.P. compressor, which therefore need not necessarily have variable stagger, the variable speed transmission being controlled automatically by control means 51 of any suitable known kind.

D* is the obvious variant of D, in which there is a power-gas-turbine.

G* is the cycle of G, changed in that a first L.P. compressor is provided, driven through a variable-speed transmission 50, by a shaft which entails a waste-heat steam turbine positively entrained in the final drive gearbox. In such a case it may be especially desirable to provide for non-running of the L.P. compressor and direct air admission to the compound gas turbine set.

G** illustrates the same compound cycle as G* but with a separate power turbine.

Figure 5:
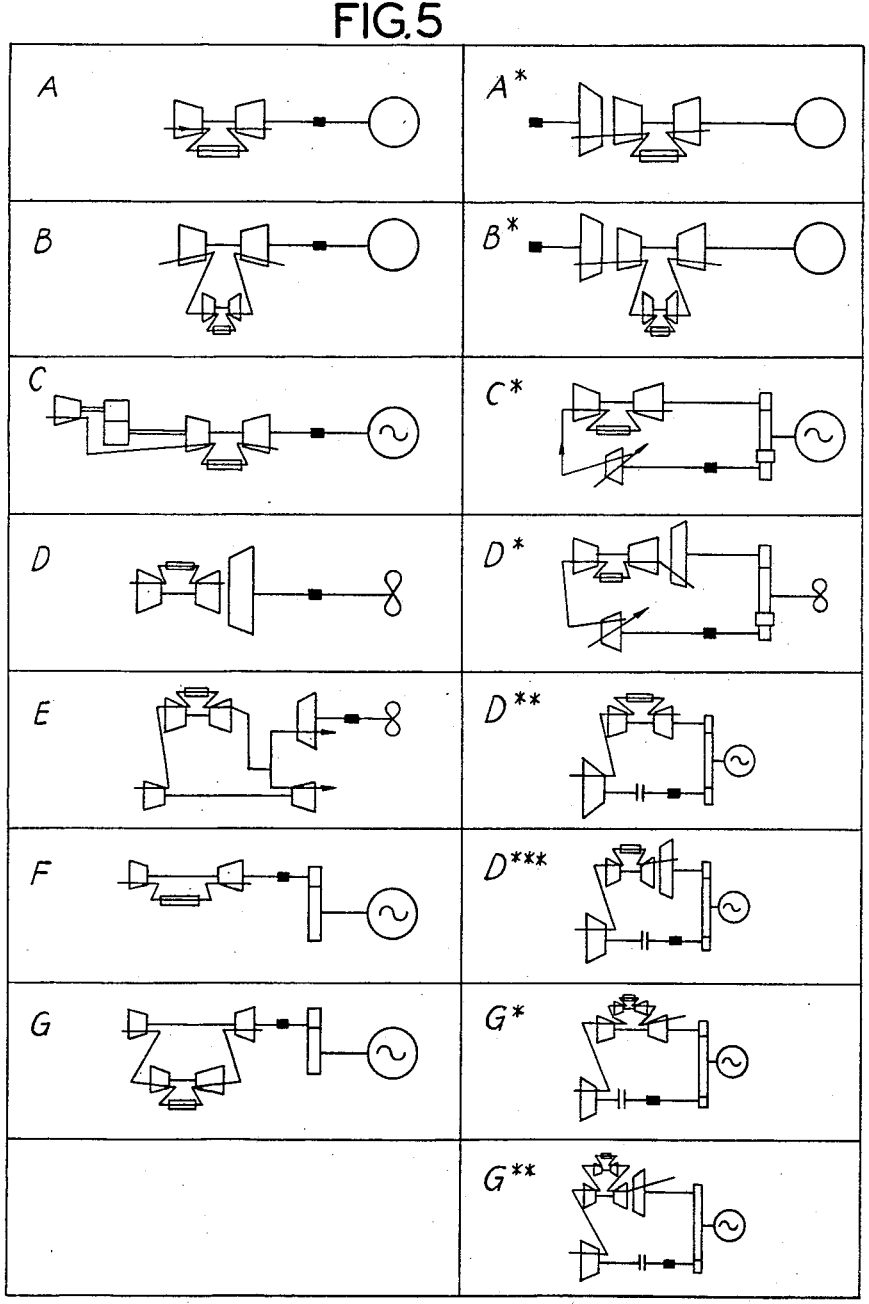
FIGURE 5 is an illustrative chart which shows in the left-hand column, a series of prior proposals for shaft-power gas turbine plant, and in the right-hand column, corresponding forms of plant according to the invention.

All the inventive variants in FIGURE 5 have waste-heat-steam turbines. It is not to be inferred that this is essential to the invention, though it is preferred for most large plant applications. It suffices for the invention that there be an L.P. compressor in which the work done is controllable.

No means of control have been described in detail. Those conversant with the art are well able to select such detail from the great number of available devices, be they based on response to pressure, temperature, shaft-power, or combinations of these. It may even be in some cases expedient simply to use manual control. For example, in some marine cases there is a very clear distinction between a "crusing" or part-load regime and a full-power regime. In such a case it can be foreseen that the control exercised will be by way of a step-by-step (possibly a simple 2-speed) change-speed gearbox and a clutch or hydraulic coupling to avoid gear change shock. Some manual control may be expedient, for example in applications of the invention in which the L.P. compressor is driven separately for starting.

I claim:

1. A method of operating a gas turbine shaft-power plant so as to achieve part-load operational efficiencies comparable with full-load operational efficiency, said plant including a high-pressure compressor set positively driven by gas turbine set and delivering the working air to the gas turbine set through air-heating means, and a low-pressure compressor connected to and capable of passing to the high-pressure compressor set the whole of the air compressed by the latter, said method comprising selectively varying the pressure ratio of the low-pressure compressor so as to maintain the temperature of the working air at the inlet to the gas turbine set substantially at a constant value during varying load conditions of the plant.

2. Gas turbine shaft-power plant of the open-cycle kind including a high-pressure compressor set positively driven by a gas turbine set and delivering the working air to the gas turbine set through air-heating means, there being a low-pressure compressor connected to and capable of passing to the said high-pressure compressor set the whole of the air compressed by the latter, in combination with control means for selectively controlling the pressure ratio of the said low-pressure compressor and means responsive to changes in at least one operational parameter of the plant other than output speed for affecting said control so as to maintain the temperature of the working air at the inlet to the gas turbine set substantially at a chosen value within the limits of the intended design load conditions of the plant.

3. Plant according to claim 2, comprising controllably variable speed transmission mechanically drivably connecting said low-pressure compressor with said gas turbine set for effecting control of the pressure ratio of the low-pressure compressor.

4. Plant according to claim 2 comprising a waste heat boiler energised by the exhaust from the gas turbine set; a steam turbine supplied by said boiler; mechanical driving connection between said steam turbine and said low-pressure compressor, the pressure ratio of the low pressure compressor being determined by the operating conditions of the steam turbine.

5. Plant according to claim 2 comprising a waste heat boiler energised by the exhaust from the gas turbine set; a steam turbine supplied by said boiler; mechanical driving connection between said steam turbine and said low pressure compressor such that the pressure ratio of the low pressure compressor is determined by the operating conditions of the steam turbine and mechanical driving connection between said steam turbine and said gas turbine set whereby steam turbine shaft power may be arithmetically additive to gas turbine shaft power.

6. Plant according to claim 2 in which said low pressure compressor is a multi-stage axial-flow compressor comprising several successive stages of variable-stagger stator blading such as to afford control of the pressure-ratio of said low-pressure compressor.

7. Plant according to claim 2, further comprising means associated with the driving means of said low-pressure compressor whereby said low-pressure compressor can be stopped whilst the plant is running, and means for admitting the working air directly to said high-pressure compressor set when the low-pressure compressor is so stopped.

8. Plant according to claim 2 including mechanical transmission means drivably interconnecting said compressor set, said gas turbine set, said low-pressure compressor, and a waste-heat steam turbine.

9. Plant according to claim 2 further comprising
a waste-heat boiler energised by the exhaust from the gas turbine set;
a steam turbine drivably connected to said low-pressure compressor;
a supply of steam independent of said boiler;
provision whereby said steam turbine can be used supplied by said independent supply of steam for starting the plant.

10. A gas-turbine shaft-power plant of the closed cycle kind including a high-pressure compressor set positively driven by a gas turbine set and delivering the working air to the gas turbine set through air-heating means, there being a low-pressure compressor connected to and capable of passing to the said high-pressure compressor set the whole of the air compressed by the latter, including means responsive to at least one operational parameter of the plant other than output speed for selectively varying the pressure ratio of the said low-pressure compressor at any given load between a maximum figure which corresponds to maximum work in the low-pressure compressor and a lower figure which corresponds substantially to no useful work or to negative work in said low-pressure compressor in such a sense as to maintain the temperature of the working air at the inlet to the gas turbine set at a substantially constant value.

11. Plant according to claim 10 including means for selectively controlling the pressure-ratio of the low-pressure compressor in such sense that a condition tending to cause an increase of said temperature of the working air promotes an increase of mass flow and conversely.

References Cited

UNITED STATES PATENTS

| 2,428,136 | 9/1947 | Barr. |
| 2,659,528 | 11/1953 | Price. |
| 2,663,145 | 12/1953 | Waeselynck. |
| 2,705,590 | 4/1955 | Lovesey et al. |
| 2,705,865 | 4/1955 | Mann. |
| 3,285,567 | 11/1966 | Richardson. |
| 3,066,488 | 12/1962 | Mock _____ 60—39.29 XR |
| 3,177,659 | 4/1965 | Berman. |

FOREIGN PATENTS

| 601,999 | 7/1960 | Canada. |
| 1,029,635 | 3/1953 | France. |
| 1,206,492 | 8/1959 | France. |
| 860,901 | 12/1952 | Germany. |
| 679,007 | 9/1952 | Great Britain. |

CARLTON R. CROYLE, Primary Examiner

U.S. Cl. X.R.

60—39.18, 39.29; 230—114

UNITED STATES PATENT OFFICE
Certificate of Correction

Patent No. 3,500,636                                March 17, 1970

Hugh Robert Morton Craig

It is certified that error appears in the above identified patent and that said Letters Patent are hereby corrected as shown below.

In the drawings, Sheet 5, cancel Fig. 5 and insert the following:

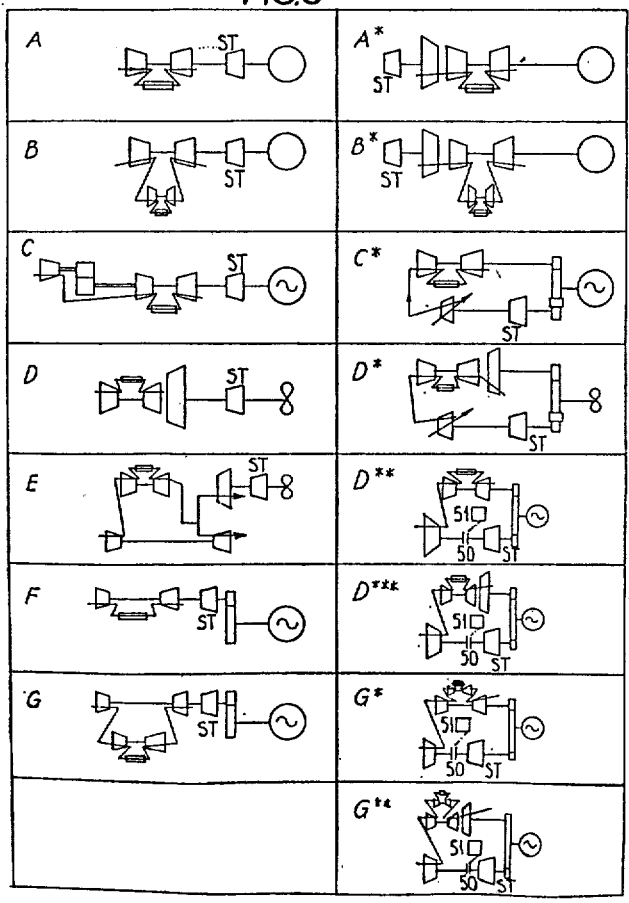

Signed and sealed this 22nd day of December 1970.

[SEAL]

Attest:

EDWARD M. FLETCHER, JR.,
*Attesting Officer.*

WILLIAM E. SCHUYLER, JR.,
*Commissioner of Patents.*